Nov. 20, 1928.  
E. P. EDWARDS  
1,692,638  
UNIVERSAL JOINT  
Filed March 25, 1927   2 Sheets-Sheet 2

INVENTOR  
Eugene P. Edwards

Patented Nov. 20, 1928.

1,692,638

UNITED STATES PATENT OFFICE.

EUGENE P. EDWARDS, OF FLEMINGTON, NEW JERSEY, ASSIGNOR TO SIMPLEX UNIVERSAL JOINT, INC., OF FLEMINGTON, NEW JERSEY, A CORPORATION OF NEW JERSEY.

UNIVERSAL JOINT.

Application filed March 25, 1927. Serial No. 178,166.

This invention relates to a universal joint and more particularly to a universal joint of the ball and socket type in which as is customary a pin is provided to extend through and beyond the surface of the ball and in which in the casing of the joint there is a socket provided with bearings to receive the projecting ends of the pin. In this particular type of joint in order to permit the joint to operate with a minimum amount of friction it is necessary to form the parts with exact precision. This is due to the fact that the bearings for the ends of the pin as generally constructed are fixed in position and usually form a part of the socket member of the device. In carrying out my invention, however, I provide bearings which are revoluble in the casing and are so journaled therein as to permit of a revoluble movement but not to permit of a lateral or radial movement of the bearings relatively to the casing of the structure, whereby the bearings for the ends of the pin are made self-aligning and there is no lost movement of the bearings in a transverse direction. These features, together with other structural features of the joint will be hereinafter more particularly described.

Figure 1:
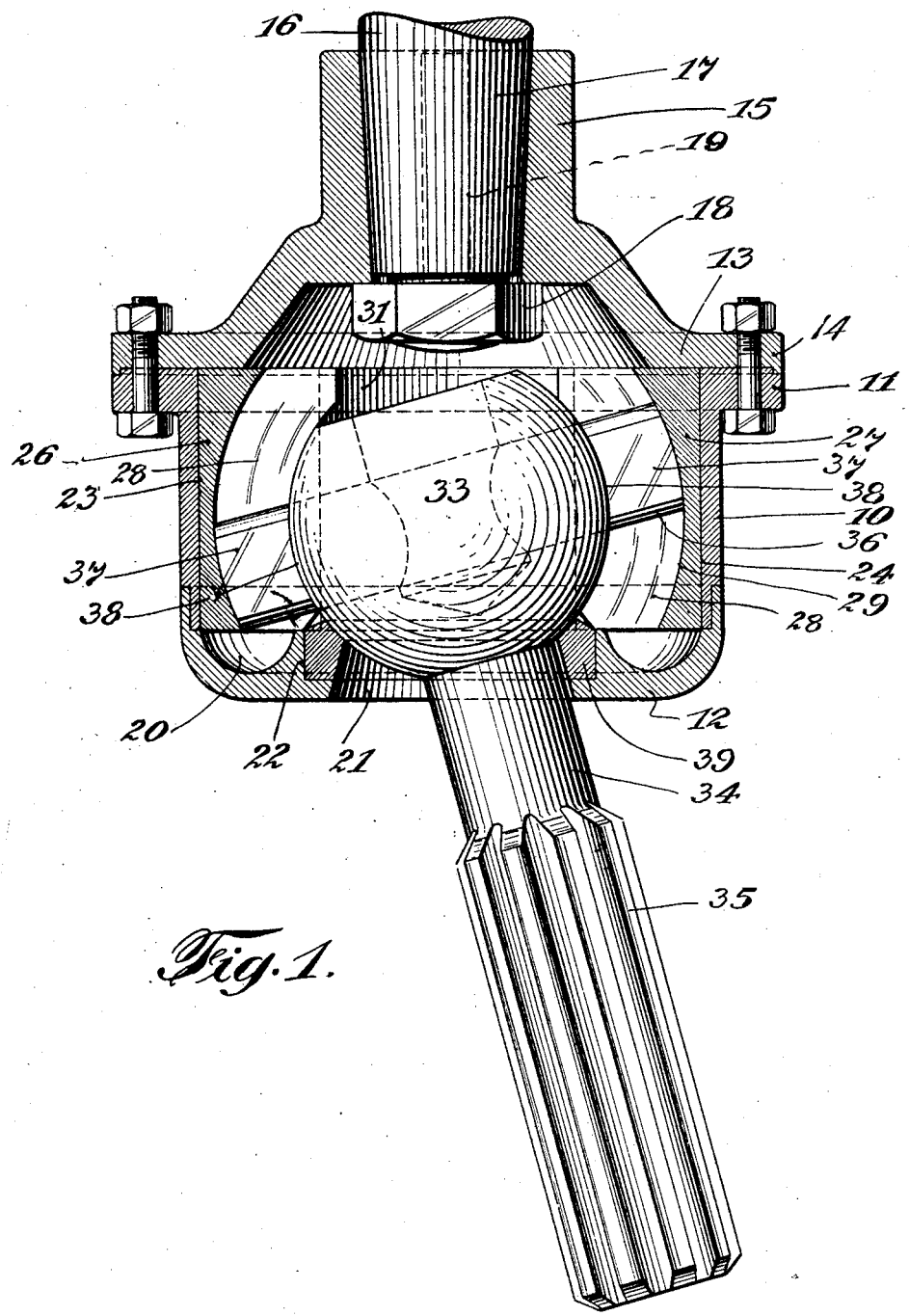

In the drawing Figure 1 is a central longitudinal section and partial elevation of a universal joint made in accordance with my present invention.

Figure 2:
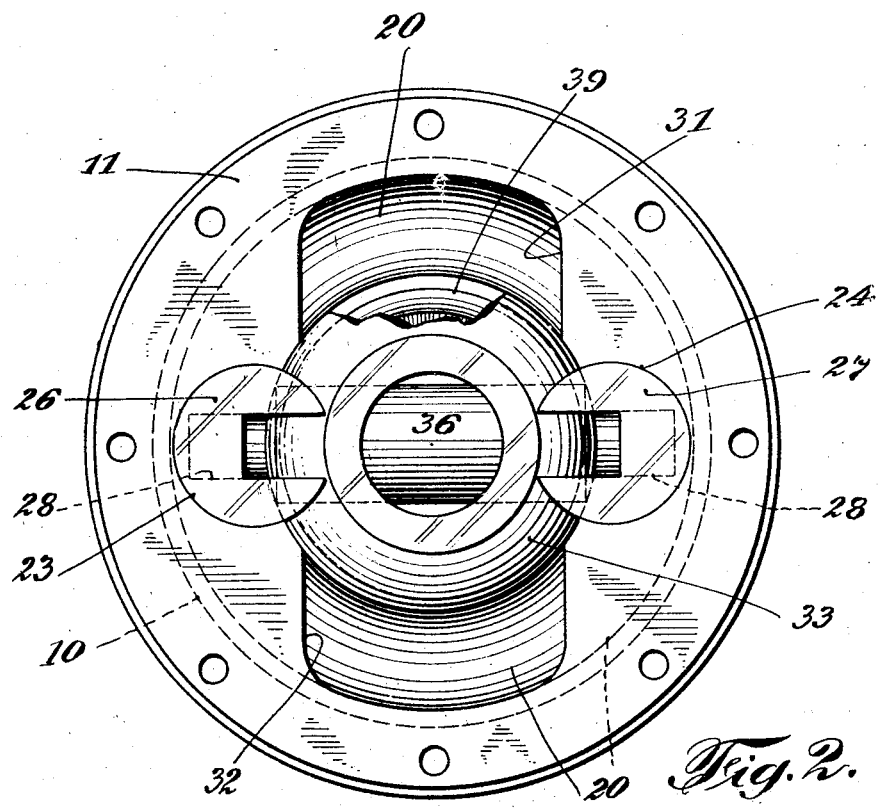
Figure 3:
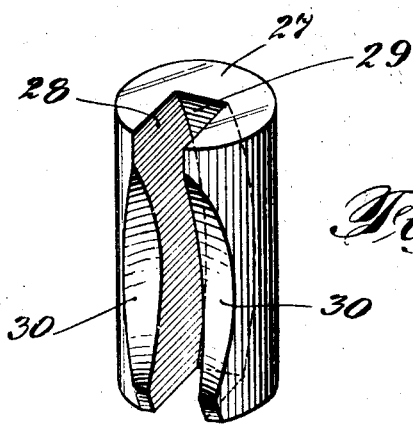

Fig. 2 is a plan showing the cover removed to illustrate the construction of the interior of the socket member of the joint, and Fig. 3 is a perspective view illustrating one of the self-aligning cylindrical bearings.

As hereinbefore stated, the universal joint to which this invention relates is of the ball and socket type. The socket member of the joint comprises a casing consisting of a cylindrical member 10 having a flange 11 at one end thereof and provided at the other end with a cap 12, together with a cover 13 having a flange 14 which is a companion to the flange 11 and adapted to be connected thereto by suitable bolts or otherwise, and which cover is constructed with a centrally disposed hub 15. The hub 15 is adapted to be connected to a shaft 16, the reduced end 17 of which passes into the hub and may be secured in position by a nut 18 and also by a suitable key 19 or otherwise.

The cap 12 is constructed to have a peripheral cylindrical portion which is interiorly recessed and the adjacent outer portion of the cylindrical member 10 of the casing is exteriorly recessed so as to receive the cap 12 and these parts are then suitably secured to one another by welding or in any other manner known to the art. It will be understood, of course, that the only reason for making the parts of the casing in separate members and connecting them is for expediency in manufacture. Furthermore, as illustrated, the cap member 12 is interiorly provided with a circular recess 20 and with an opening 21 together with a recess indicated at 22. The cylindrical member 10 of the casing is provided in oppositely disposed positions with cylindrical bores 23 and 24. These bores are appreciably more than semi-circular and extend longitudinally the full length of the cylindrical member of the casing. These bores are adapted respectively to receive cylindrical bearings 26 and 27. As indicated in Fig. 3 of the drawing each of these cylindrical bearings is provided with a longitudinal groove 28. The base of the groove 28 is formed on the arc of a circle as indicated at 29 and the oppositely disposed lateral walls defining this groove are preferably parallel and the edge portions thereof are formed with spherical recesses as indicated at 30. In the cylindrical member 10 of the casing there are recessed portions as indicated at 31 and 32 in positions oppositely disposed and preferably midway between the bores 23 and 24. These recesses 31 and 32 are for the double purpose of reducing the weight of the casing and providing chambers for the reception and retention of grease or any other suitable lubricant.

Within the casing or socket member there is a ball member 33, integral with or suitably secured to the end of a shaft 34 which passes through the opening 21 in the cap of the casing and exteriorly thereof is provided with a series of circumferentially arranged ribs 35 and intervening recesses for the reception of a counter-part structure carried by a sleeve to form a slip joint. Of course, it will be understood that the shaft 16 may be a drive shaft and the shaft 34 a driven shaft, or vice versa, depending upon the manner in which the joint is connected for use.

The ball member 33 is made with a transverse bore to receive a pin 36 which passes through the same and extends beyond the periphery thereof. The outer ends of the pin extend into the grooves 28 in the cylindrical bearing members 26 and 27, which grooves form bearings for the ends of the pin. The ends of the pin are flattened as indicated at 37 so as to fit within the grooved bearings in the cylindrical members and at the inner ends of the flattened faces of the pin the surface is preferably made spherical as indicated at 38 so as to engage the correspondingly shaped and adjacent portion of the surface of the socket in the same manner as shown and described in U. S. Letters Patent No. 1,447,934 granted to me, March 6, 1923.

Fitting in the recess 22 there is a ring member 39 through which the shaft 34 passes and which at its inner end is so constructed as to wipe the surface of the ball member 33 and to prevent the leakage of the lubricant from the casing. This particular construction, however, forms no material part of the present invention.

In the operation of the apparatus hereinbefore described, as will now be understood, while the parts may be made with exactness, it is not necessary to make them with the same precision as if the cylindrical bearing members were not constructed to align themselves with the projecting ends of the pin, and furthermore, while the cylindrical bearing members are revoluble in the bearings or journals in which they fit due to the fact that these bearings or journals are more than semi-circular, there can be no lateral or radial movement in these cylindrical bearing members, it being understood that the revoluble movement of the cylindrical bearings to adjust themselves automatically to position relatively to the ends of the pin is possible because of the recessed edge portions of the lateral walls defining the grooves in these bearings with a part of which the surface of the ball contacts as well as with the spherical socket or stud provided for the ball in those portions of the socket intermediate of the bores for the bearings and the recesses intermediate thereof.

I claim as my invention:

1. In a universal joint, a cylindrical casing having oppositely disposed walls in which there are similarly placed longitudinal bores, cylindrical bearing members each fitting within one of said bores and having a longitudinal groove therein with the edge portions defining the groove having a spherical recess therein, a shaft having a ball head adapted to fit between the oppositely disposed walls of the cylinder casing, a pin passing through and journalled in a transverse bore in the said ball head, the said pin extending beyond the surface of the ball head with the ends of the pin having flattened surfaces with spherical shoulders at the inner ends thereof adapted to co-operate with said spherical recesses in the said cylindrical bearings, and means for connecting a second shaft to the said cylindrical casing.

2. In a universal joint, a cylindrical casing having oppositely disposed walls in each of which there is a more than half round bore, a cylindrical bearing fitting in each more than half round bore, there being a part of each cylindrical bearing that extends transversely outside of its bore, each cylindrical bearing having a longitudinally disposed groove with spherically recessed portions in the part of the bearing which extends outside of the bore, a shaft extending through one end of the casing and having a ball head adapted to lie within the casing, a pin extending through and journaled in a bore provided therefor in the ball head of the shaft, the pin extending beyond the surface of the ball head and having its ends provided with flattened faces, there being spherical shoulders at the inner ends of the flattened faces of the ends of the pin, the flattened faces of the pin being adapted to fit and operate in the grooves in the cylindrical bearings and the spherical shoulders on the pins and the adjacent surface of the ball head to bear against and co-operate with the spherical recesses in the projecting portions of the bearings, and means for securing a second shaft to the said cylindrical casing.

3. In a universal joint, a cylindrical casing having a flange at one end thereof and oppositely disposed walls therein, there being similarly placed longitudinal bores in the said oppositely disposed walls of the casing, cylindrical bearing members each fitting within one of the said cylindrical bores with a part of each cylindrical bearing member extending transversely outside of its bore, each cylindrical bearing having a longitudinally disposed groove with spherical recesses in the outer portions defining the said longitudinal groove, a shaft having a ball head, the shaft passing through one end of the cylindrical casing and the ball head fitting between the said oppositely disposed walls thereof, a pin passing through a bore provided therefor in the ball head and extending beyond the same, the ends of the pin having flattened faces with spherical shoulders at the inner ends of the flattened faces, the flattened faces of the pin being adapted to engage in the grooves in the cylindrical bearings and the spherical shoulders of the pin and the adjacent surface of the ball head to engage and co-operate with the spherical recesses of the cylindrical bearings, a cover, means for connecting the cover to the flanged end of the cylindrical casing, the said cover bearing against corresponding ends of the said cylindrical bearings, and a second shaft connected to the said cover.

Signed by me this 16 day of March, 1927.

EUGENE P. EDWARDS.